Feb. 27, 1934.   W. L. McDONALD   1,948,726
VALVE CONTROL FOR POWER OPERATION OF LEVERS
Filed Nov. 7, 1932   2 Sheets-Sheet 1
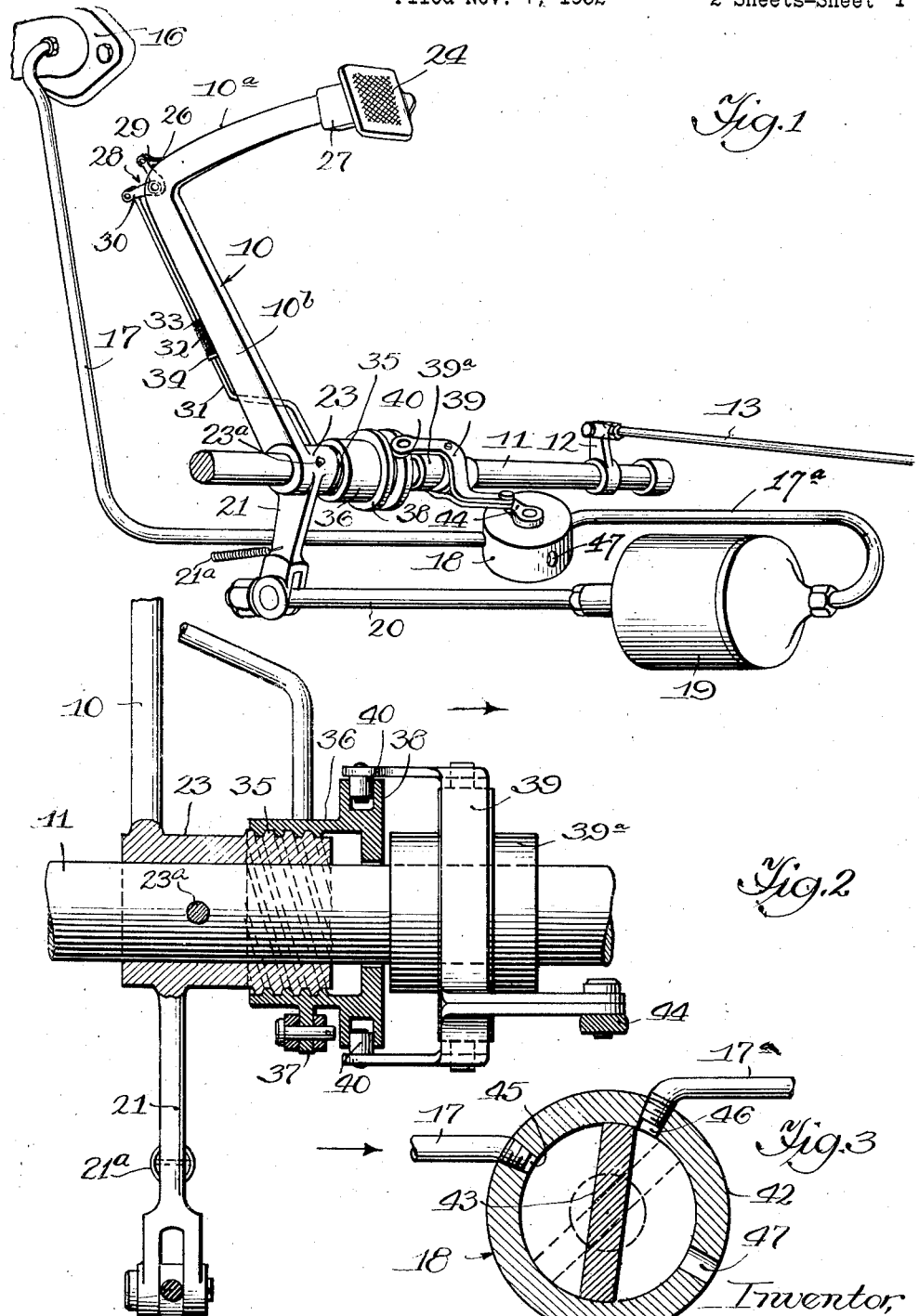

Feb. 27, 1934.  W. L. McDONALD  1,948,726
VALVE CONTROL FOR POWER OPERATION OF LEVERS
Filed Nov. 7, 1932   2 Sheets-Sheet 2

Inventor,
William L. McDonald,
by Clarence E. Mellidge Atty.

Witness:
Chas. K. Konrah

Patented Feb. 27, 1934

1,948,726

UNITED STATES PATENT OFFICE 1,948,726

VALVE CONTROL FOR POWER OPERATION OF LEVERS

William L. McDonald, Geneva, N. Y.

Application November 7, 1932. Serial No. 641,573

7 Claims. (Cl. 188—152)

This invention relates to a novel valve control for power operation of levers for brakes, clutches and the like, and consists of the matters hereinafter described and more particularly pointed out in the appended claims.

My improved valve control is designed for use primarily in automobiles in connection with a power cylinder for operating the brake lever, clutch lever, or the like, under vacuum derived from the inlet manifold of the engine. It may also be used where the power of the cylinder is furnished by compressed air or other gas and its use is obviously not limited to automobiles.

The object of the invention is to produce a valve control of the kind, which is of simple and economical construction and which is operated by reason of a limited motion of the pedal or foot piece independently of the brake or clutch lever without interfering with the operation of the lever by foot power when and if desired. The advantages of the invention will appear more fully as I proceed with my specification.

In the drawings:—

Figure 1 is a view representing diagrammatically in perspective the improved valve control.

Figure 2 is a view on an enlarged scale, partly in section and partly in elevation, showing the brake lever hub and mechanism associated therewith for shifting the valve intermediate the power cylinder and the inlet manifold.

Figure 3 is a view representing a transverse section through the valve.

Figure 4:
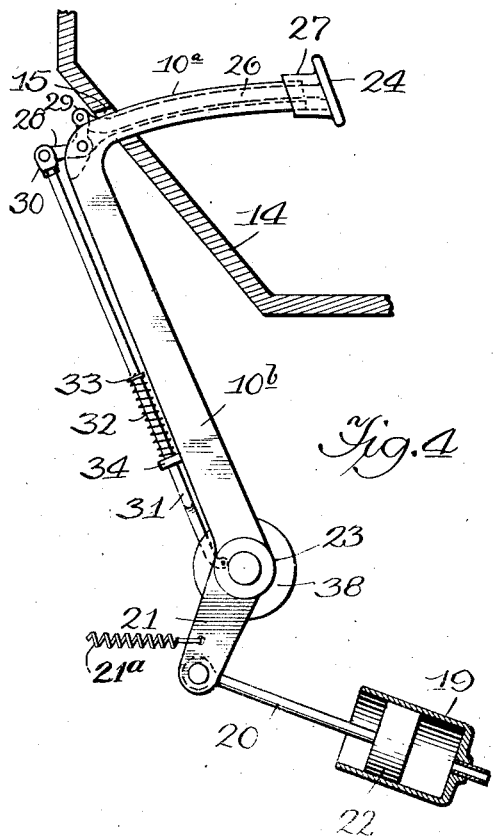
Figure 4 is a view representing diagrammatically the brake lever and power cylinder with the parts in normal position.

In illustrating the novel valve control, I have shown it in association with and connected to control the power operation of the brake lever of an automobile; but it will be obvious that it is equally applicable for use in the control of the operation of the clutch lever or other lever by power derived from a cylinder connected by a valve to a source of vacuum or pressure.

Referring now to the drawings, 10 indicates the familiar brake lever, which is angular in form and is mounted on a horizontal rock shaft 11 carrying a rock arm 12 connected by a link 13 for operating the brake. The rock shaft 11 is held in normal position by a spring 21a. 14 indicates the upwardly and forwardly inclined part of the floor-way of an automobile through an opening 15 in which the upper part 10a of the brake lever projects. 10b indicates the lower part of the brake lever which extends down to the rock shaft 11.

16 indicates the inlet manifold of the engine from which leads a pipe 17 connected through a valve 18 to a power cylinder 19. 20 indicates a pitman which connects an arm 21 depending from the hub 23 of the brake lever to the piston 22 of the power cylinder 19. The brake lever hub 23 is fixed on the rock shaft 11 in the usual manner by a pin 23a.

24 indicates the foot piece or pedal mounted at the end of the upper part 10a of the brake lever. Said lever part 10a is slotted longitudinally, as indicated at 25, and in said slot is mounted a longitudinally movable bar 26, which normally projects slightly beyond the end of the lever-part 10a, where it is fixed to the pedal 24. The pedal 24 has a flange 27 which embraces and slides on the end of the lever part 10a. At the angle of the lever in the slot 25 is pivotally mounted a small bell crank lever 28, one arm 29 of which is pivotally connected to the bar 26, which is slightly turned up towards said arm, as clearly indicated in Figures 4 and 5. Pressure on the pedal 24 will rock the bell crank lever 28 to swing its arm 30 downwardly. Said arm 30 is pivotally connected to a spring-controlled plunger 31 which extends parallel to and along the side of the lever part 10b down into the neighborhood of the lever hub 23. 32 indicates an expansion coiled spring on the plunger rod 31, which acts between a pin 33 on said rod and a collar 34 through which said rod extends and which is fixed to the lever part 10b. The spring acts to push the rod upwardly and to swing the bell crank lever 28 in a direction opposed to its movement when actuated by the pedal 24.

The lever hub 23 is prolonged at one end and is provided with a thread 35 of high pitch. A sleeve 36, internally threaded with a like thread, is mounted on the threaded end of the hub 23. The sleeve 36 has an arm 37 to which the plunger rod 31 is pivotally connected, said rod being bent slightly intermediate its ends to bring its lower end into the plane of said arm 37, as clearly appears in Figures 1 and 2. The sleeve 36 has a grooved flange 38 which is engaged by a yoked arm 39 provided with anti-friction rollers 40 which engage in the groove of the flange 38. The yoked arm is pivotally connected to a sleeve 39a which is slidably and rotatably mounted on the rock shaft 11. It will be understood that this sleeve is not affected by the rotation of the rock shaft, since it is loose on said shaft. And the pivoting of the yoked arm to the sleeve is merely to accommodate the slight difference in the reciprocatory movement of the yoked arm as compared to the slightly arcuate movement of the crank pin of the valve crank arm to which it is connected, as will later appear.

From the foregoing it will be obvious that a pressure on the pedal 24 will move the bar 26 longitudinally in the groove 25 to swing the bell crank lever 28 and depress the plunger rod 31. This will rotate the sleeve 36 on its threaded connection with the hub 23, causing said sleeve 36 to move laterally in the direction of the arrow shown at 41 in Figure 2, with the result that the yoke 39 is moved in the same direction.

The valve 18 is the ordinary two-way valve. As shown in the drawings, it is a rotary valve comprising a casing 42 and a rotative valve piece 43 actuated by a crank arm 44 on the outside of the casing. Said crank arm is pivotally connected to the yoked arm 39.

Figure 5:
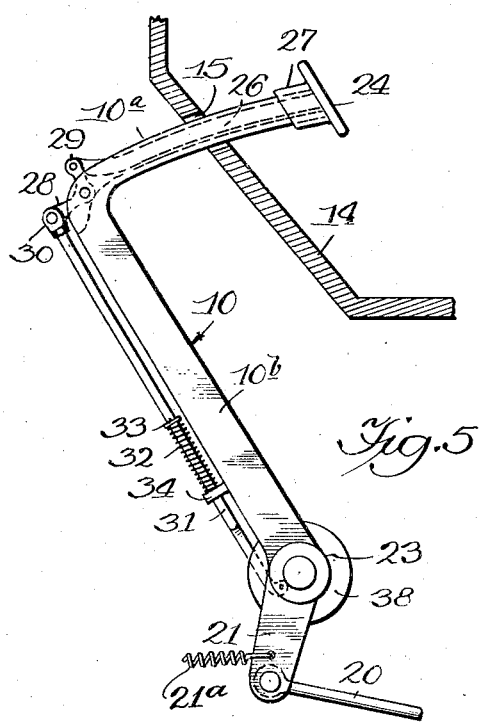
Figure 5 is a view similar to Figure 4 with the parts shown in a different relation.
Figure 6:
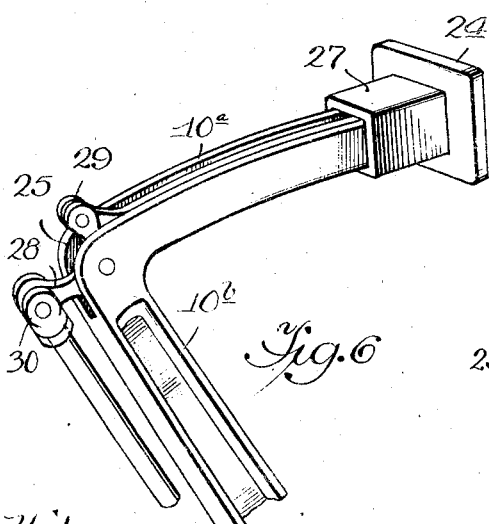
Figure 6 is an enlarged perspective view of the upper part of the brake lever and the parts carried thereby.
Figure 7:
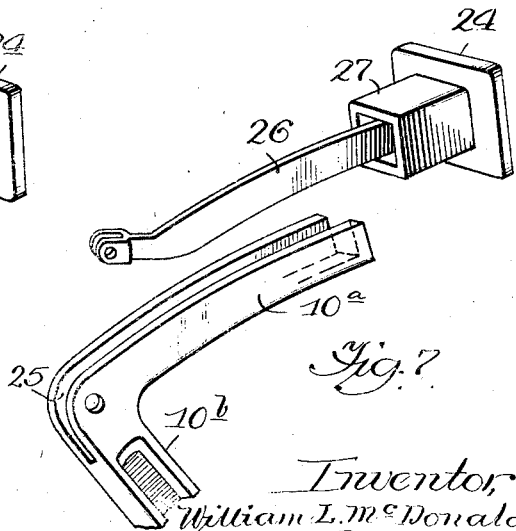
Figure 7 is a perspective view on a similar scale showing the upper end of the brake lever with the pedal and the plunger carried thereby in disassembled relation.

45, 46 indicate spaced ports in the casing into which the pipe 17 leading from the manifold enters and from which the branch pipe 17a leading to the power cylinder leaves the casing. 47 indicates a port leading to the atmosphere. In the position shown in full lines in Figure 3, which is that position which the valve piece occupies normally (with the foot piece 24 away from the end of the lever part 10a, as shown in Figure 4) the valve piece bridges the port leading to the power cylinder and the port leading to the atmosphere, thus providing a release of vacuum in the cylinder, allowing the brake to assume its normal position because of its normally actuating spring. The position shown in dotted lines corresponds with the position which the parts occupy when the pedal or foot piece 24 has been moved to a position to engage the end of the lever part 10a (as shown in Figure 3) when the valve piece bridges the ports leading to the pipe 17 and its branch 17a, thus connecting the power cylinder with the manifold to reduce the pressure in the cylinder and allowing atmospheric pressure on the outer end of the piston 22 to exert a pull on the pitman 20. This force will continue as long as the parts 24 and 10a are held in the relative positions shown in Figure 5. When the motion of 24 is stopped, the shaft 11 will continue to move until the thread 35 has brought the part 36 to its midway position, when the port 46 will be closed and motion stopped.

The operation of the mechanism will be apparent from the foregoing description. A slight pressure by the foot on the pedal 24 will operate the plunger to shift the yoke 39 and operate the valve piece 43 to connect the inlet manifold with the power cylinder 19, as shown by the dotted lines in Figure 3. The piston is thus operated to swing the brake lever 10 and the brake lever will follow the pressure on the pedal 24 until the part 36 is midway between its two extreme positions, when the port 46 will be closed and motion stopped. As soon as the foot is taken from the pedal, the spring 32 will restore the plunger 31 and its connected parts to their normal position, operating the valve piece to bring it to its position shown in full lines in Figure 3, with the branch pipe 17a connected by the port 47 to the atmosphere. The pressure on the piston in the power cylinder is thereby balanced and the brake lever is returned to its original, normal position in the usual manner.

It will be understood that after the pedal 24 has been moved to shift the valve piece 43 from the position shown in full lines to that shown in dotted lines in Figure 3, thus connecting the inlet manifold to the power cylinder and causing the piston in said cylinder to pull down the lever 10, if the pressure on the pedal 24 be slightly relieved, the spring 32 will act to raise the pedal to the normal position shown in Figure 4. The sleeve 36 will then be shifted to its normal position in which the valve piece 43 connects the port opening into the branch pipe 17a with the atmosphere, allowing the brake to follow until the thread 35 has brought 36 and with it the valve piece 43 to the midway position, closing port 46, and so stopping further motion of lever 10a. Additional pressure on the pedal will again actuate the sleeve 36 to swing the valve to the position shown in dotted lines in Figure 3, again connecting the power cylinder with the inlet manifold of the engine and imparting a further pull to the brake lever. Thus by means of the improved control, the brake is capable of delicate manipulation under the pull of the power cylinder to provide any pressure on the brake desired. Obviously, a like control may be had when releasing the brake by properly manipulating the foot pedal between the neutral position and the original first position, which it assumes when the foot is entirely lifted from the foot pedal. In any position of the brake lever, there is possible the differential of movement between the pedal and the brake lever, with the corresponding longitudinal movement of the sleeve on the brake lever hub, to control the movement of the valve.

While in setting forth my invention, I have exhibited a preferred embodiment thereof and have described and illustrated mechanical details as a part of that embodiment, it is to be understood that the invention is in no way limited thereto except as may be pointed out in the appended claims.

I claim as my invention:

1. A valve control for power operation of levers, comprising a valve, a lever, a sleeve rotatable about the fulcrum axis of said lever and longitudinally movable along said axis as it is rotated, means operatively connecting said sleeve to said valve, a foot piece mounted on said lever and capable of limited movement thereon, and spring-controlled means mounted on said lever operatively connecting said foot piece to rotate said sleeve by the movement of said foot piece.

2. A valve control for power operation of levers, comprising a valve, a lever, a sleeve rotatable about the fulcrum axis of said lever and longitudinally movable along said axis as it is rotated, means operatively connecting said sleeve to said valve, a spring-controlled plunger on said lever connected to rotate said sleeve, and a foot piece mounted on said lever and connected to said plunger, said foot piece being capable of limited movement with respect to said lever.

3. A valve control for power operation of levers, comprising a valve, a lever having a hub, a sleeve rotatable on said hub and longitudinally movable thereon as it is rotated, means operatively connecting said sleeve to said valve, a spring-controlled plunger on said lever connected to rotate said sleeve, a foot piece mounted on said lever and having limited movement thereon, and means connecting said foot piece and plunger.

4. A valve control for power operation of levers, comprising a valve, a lever having a hub, a sleeve rotatable on said hub and longitudinally movable thereon as it is rotated, means operatively connecting said sleeve to said valve, a spring-controlled foot piece mounted on said lever and capable of limited movement thereon, and means operatively connecting said foot piece to rotate said sleeve.

5. A valve control for power operation of levers, comprising in combination with a valve, an angular lever having a hub, a sleeve rotatable on said hub constructed to move longitudinally thereon when rotated, means operatively connecting said sleeve to said valve, a spring-controlled plunger connected to rotate said sleeve extending from said hub along and supported by said lever, a longitudinally movable bar mounted in the part of said lever beyond the angle, said bar extending slightly beyond the end of said lever, a foot piece fixed to the projecting end of said bar and slidably mounted on the end of said lever, and a bell crank pivotally mounted in the angle of said lever with one arm connected to said bar and the other connected to said plunger.

6. A valve control for power operation of levers, comprising in combination a valve, a lever having a hub, a sleeve rotatable on said hub constructed to move longitudinally on said hub when rotated, means operatively connecting said sleeve to said valve, a spring-controlled plunger on said lever connected to rotate said sleeve, a longitudinally movable bar mounted on said lever and projecting beyond the end of the same, a foot piece fixed to the projecting end of said bar and slidably mounted on the end of said lever, and means operatively connecting said bar and plunger.

7. A valve control for power operation of levers, comprising in combination a valve, a lever having a lower part and an upper part extending at an angle to each other and a hub fixed to the bottom end of the lower part, a sleeve threaded on said hub, means connecting said sleeve to said valve for operating the valve by the longitudinal movement of said sleeve, a spring-controlled plunger connected to rotate said sleeve, said plunger being mounted on the lower part of said lever, the upper part of said lever being provided with a slot, a longitudinally movable bar engaged in said slot and projecting beyond the upper part of said lever, a foot piece adapted to move said bar, said foot piece having a flanged collar mounted on the end of the upper part of said lever, and a bell crank mounted in the angle of said lever with one arm connected to said bar and the other arm connected to said plunger.

WILLIAM L. McDONALD.